United States Patent [19]

Hattori

[11] Patent Number: 4,674,359
[45] Date of Patent: Jun. 23, 1987

[54] VEHICULAR SPEED CHANGE GEAR HAVING A CONTINUOUSLY VARIABLE TRANSMISSION CONNECTED IN SERIES WITH A STEPPED GEAR TRANSMISSION

[75] Inventor: Torao Hattori, Wako, Japan

[73] Assignee: Honda Giken Kogyo Kabushiki Kaisha, Tokyo, Japan

[21] Appl. No.: 465,018

[22] Filed: Feb. 8, 1983

[30] Foreign Application Priority Data

Feb. 8, 1982 [JP] Japan .................. 57-18457
Feb. 27, 1982 [JP] Japan .................. 57-30943

[51] Int. Cl.⁴ ............................................. F16H 3/02
[52] U.S. Cl. ........................................ 74/745; 474/28
[58] Field of Search ............. 74/745, 689, 700, 701, 74/705, 694; 474/18, 28, 12

[56] References Cited

U.S. PATENT DOCUMENTS

| | | | |
|---|---|---|---|
| 2,808,738 | 10/1957 | Bartell .................. | 74/701 |
| 2,915,920 | 12/1959 | Keese et al. .......... | 74/701 |
| 3,146,633 | 9/1964 | Schmitter et al. ..... | 74/745 X |
| 4,094,203 | 6/1978 | Van Deursen et al. . | 474/28 |
| 4,114,476 | 9/1978 | Fini, Jr. ............... | 74/745 |
| 4,228,691 | 10/1980 | Smirl .................. | 474/28 X |
| 4,229,988 | 10/1980 | Rattunde ............. | 474/28 |
| 4,274,520 | 6/1981 | Van Der Hardt Aberson | 474/28 X |
| 4,294,137 | 10/1981 | Piret et al. ........... | 74/701 X |
| 4,344,500 | 8/1982 | Kurata et al. ......... | 180/230 |
| 4,350,491 | 9/1982 | Steuer ................. | 474/12 |
| 4,369,675 | 1/1983 | Van Deursen ........ | 474/18 |
| 4,392,394 | 7/1983 | Hofbauer et al. ..... | 74/689 |
| 4,400,164 | 8/1983 | Cadee ................. | 474/12 |
| 4,403,975 | 9/1983 | Rattunde ............. | 474/18 |
| 4,459,872 | 7/1984 | Tibbles ............... | 74/701 |
| 4,467,669 | 8/1984 | Kawamoto ........... | 74/689 X |

FOREIGN PATENT DOCUMENTS 239246 10/1960 Australia ..................... 474/28
560337 3/1975 Switzerland ................ 474/28
2058256 4/1981 United Kingdom .......... 474/18

OTHER PUBLICATIONS

Leotta, A. "Experiments with Electronic Control Applied to a Moped Automatic Transmission" Second Int'l Conference on Automotive Electronics, London, England (Oct. 29-Nov. 2, 1979) pp. 120-124.

Primary Examiner—Leslie Braun
Assistant Examiner—Joseph M. Rolnicki
Attorney, Agent, or Firm—Armstrong, Nikaido, Marmelstein & Kubovcik

[57] ABSTRACT

A vehicular speed change gear wherein a stepless V-belt transmission and a stepped gear transmission are disposed in series in a power transmission system connecting an engine crankshaft and a driving wheel together. An automatic speed change actuator, which automatically actuates the speed change operation of the stepless transmission in association with an engine throttle valve opening and a vehicle speed is connected to the stepless transmission, and a manual speed change actuator is connected to the stepped transmission for manually actuating the speed change operation of the latter. With these arrangements, the range of transmission ratio of the stepless V-belt transmission is set in a domain relatively high in transmission efficiency, and a shortage involved thereby of the transmission ratio is compensated with the range of transmission ratio of the stepped gear transmission, whereby a satisfactorily wide overall range of transmission ratio is thus obtainable without deteriorating the longevity of a V-belt, a high transmission efficiency is secured at all times as well, and a kickdown operation can be effected quickly.

7 Claims, 7 Drawing Figures

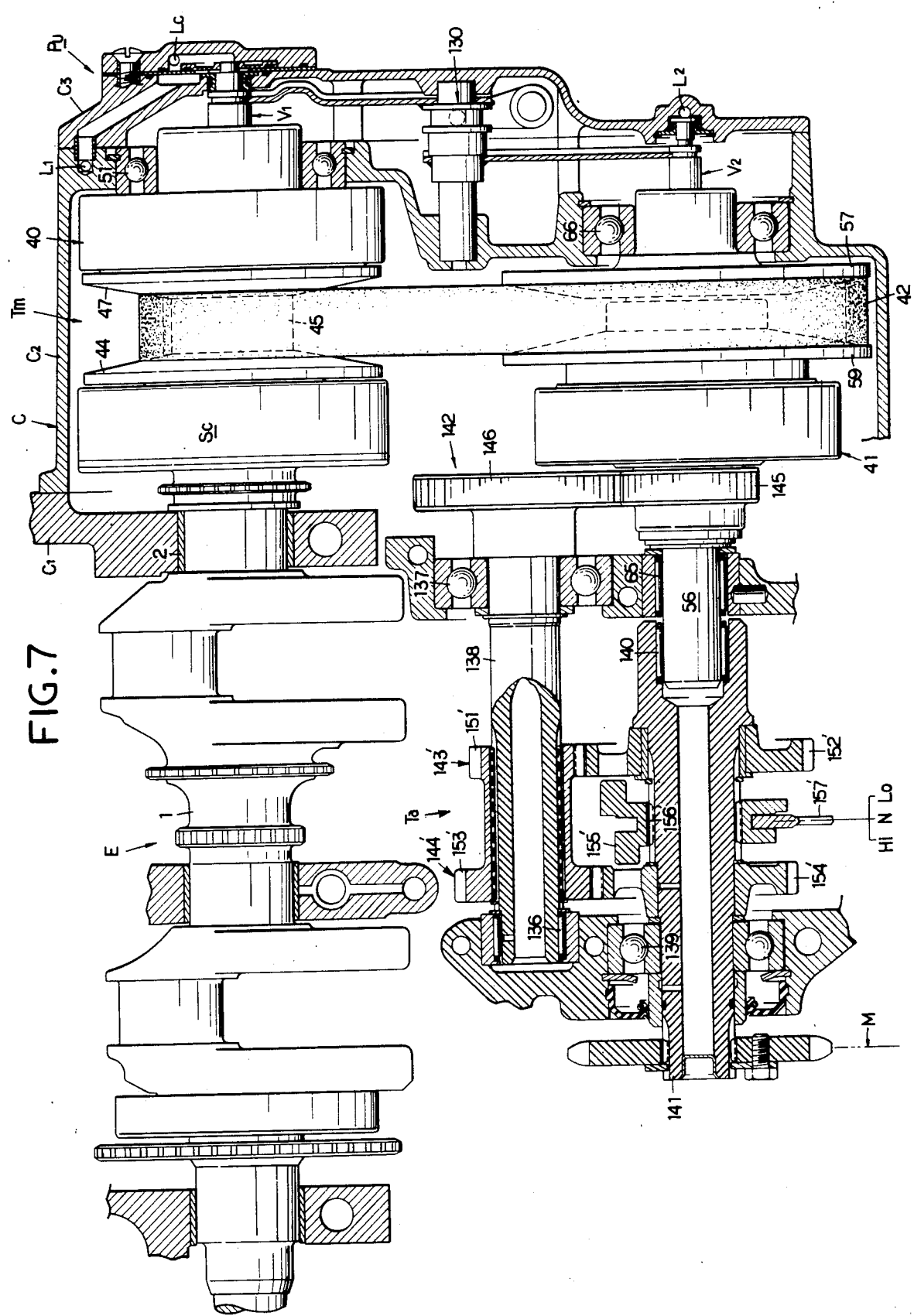

VEHICULAR SPEED CHANGE GEAR HAVING A CONTINUOUSLY VARIABLE TRANSMISSION CONNECTED IN SERIES WITH A STEPPED GEAR TRANSMISSION

BACKGROUND OF THE INVENTION

1. Field of the Invention

This invention relates to a speed change gear mounted on a power transmission system of vehicles such as motor cycles and automobiles, and particularly to a speed change gear provided with a stepless V-belt transmission.

2. Description of the Prior Art

The stepless V-belt transmission has its transmission ratio expressed as a ratio of an effective radius of the driven V-pulley to an effective radius of the driving V-pulley, therefore a large range of transmission ratio will be obtainable simply from preparing each V-pulley as a large-sized one. In a conventional type of speed change gear provided with the stepless V-belt transmission, since selection of a size of each V-pulley has been the sole measure for obtaining the desired range of transmission ratio, the following problems are quite unavoidable:

(1) With use of a large-sized V-pulley for obtaining a large range of transmission ratio, the circumferential speed and centrifugal force working on the V-belt become high, and when they exceed a given value, a life of the V-belt may severely deteriorate, and thus the size of V-pulley is subjected to the certain limitation.

(2) Transmission efficiency deteriorates in accordance with the increase of transmission ratio, therefore in a case where the range of transmission ratio is set large, a severe deterioration is invited on transmission efficiency in a low speed domain, and hence it is difficult to obtain satisfactory acceleration.

(3) If a large range of transmission ratio is to be attained by using a large-sized V-pulley, the wheel base between driving and driven V-pulleys should be enlarged, and movable pulley half-bodies of the driving and driven V-pulleys are arranged generally on the opposite sides; therefore the sum of axial movements of both the movable pulley half-bodies must be taken into consideration for space, and thus a casing large enough to enclose them will have to be prepared particularly therefor.

(4) Since the transmission operates in a stepless manner, the transmission ratio cannot be changed instantaneously to a desired value. Therefore a time lag is unavoidable when increasing the transmission ratio suddenly to a desired value for accelerated drive, or for the so-called kick-down operation.

SUMMARY OF THE INVENTION

This invention is proposed in view particularly of the above problem, and a principal object is to provide a compact speed change gear, wherein a stepless V-belt transmission and a stepped gear transmission are mounted in series in a power transmission system connecting an engine crankshaft and a driving wheel, and a part of the transmission ratio not covered by the stepless V-belt transmission having the range of transmission ratio in a domain where transmission efficiency is relatively high can be compensated with the range of transmission ratio of the stepped gear transmission, whereby the overall range of transmission ratio can be made satisfactorily wide without deteriorating the life of the V-belt, a high transmission efficiency can be maintained at all times, and a kick-down operation can be ensured swiftly.

Another object of this invention is to provide the above-mentioned speed change gear, wherein a speed change operation of the stepless V-belt transmission is effected automatically according to the correlation between an engine throttle valve opening and vehicle speed, while a speed change operation of the stepped gear transmission is carried out manually, thus facilitating the speed change operation and particularly the kick-down operation accurately. The above and further objects, features and advantages of this invention will be apparent from the following description of a preferred embodiment with reference to the accompanying drawings.

BRIEF DESCRIPTION OF THE DRAWINGS

FIG. 7 is a longitudinal sectional plan view of a main part of a power unit of another embodiment according to the invention.

DESCRIPTION OF THE PREFERRED EMBODIMENTS

The invention will now be described for its preferred embodiments with reference to the drawings. FIGS. 1 thru 6 show one embodiment of the invention, in FIG. 1 of which Pu denotes a power unit of a motor cycle, which comprises an engine E, a starting clutch Sc, and a stepless V-belt transmission Tm and a stepped gear transmission Ta constituting a speed change gear of this invention, these components being enclosed in a casing C supported on a vehicle body which is not illustrated. As shown in FIG. 2, the casing C is divided into a main case $C_1$ for enclosing the crank portion of a crankshaft 1 of the engine E and the stepped transmission Ta, an auxiliary case $C_2$ for enclosing the stepless transmission Tm, and a cover $C_3$ for closing the outside of the auxiliary case $C_2$. Then, the crankshaft 1 and other axles in the power unit Pu are disposed all in parallel with the axis of a rear wheel Wr working as a driving wheel which is supported on the vehicle body not illustrated in the rear of the power unit Pu, and an output shaft of the power unit Pu, or an output shaft 141 of the stepped transmission Ta drives the rear wheel Wr through a chain gear M.

The starting clutch Sc and the stepless transmission Tm are both constituted as a hydraulically operated types. To feed a hydraulic fluid thereto, control oil passage Lc extending from a clutch valve Vc is connected to the starting clutch Sc, and first and second lubricating channels $L_1$, $L_2$ extending from a hydraulic pump P driven by the engine E are connected to driving and driven parts of the stepless transmission respectively.

Figure 1:
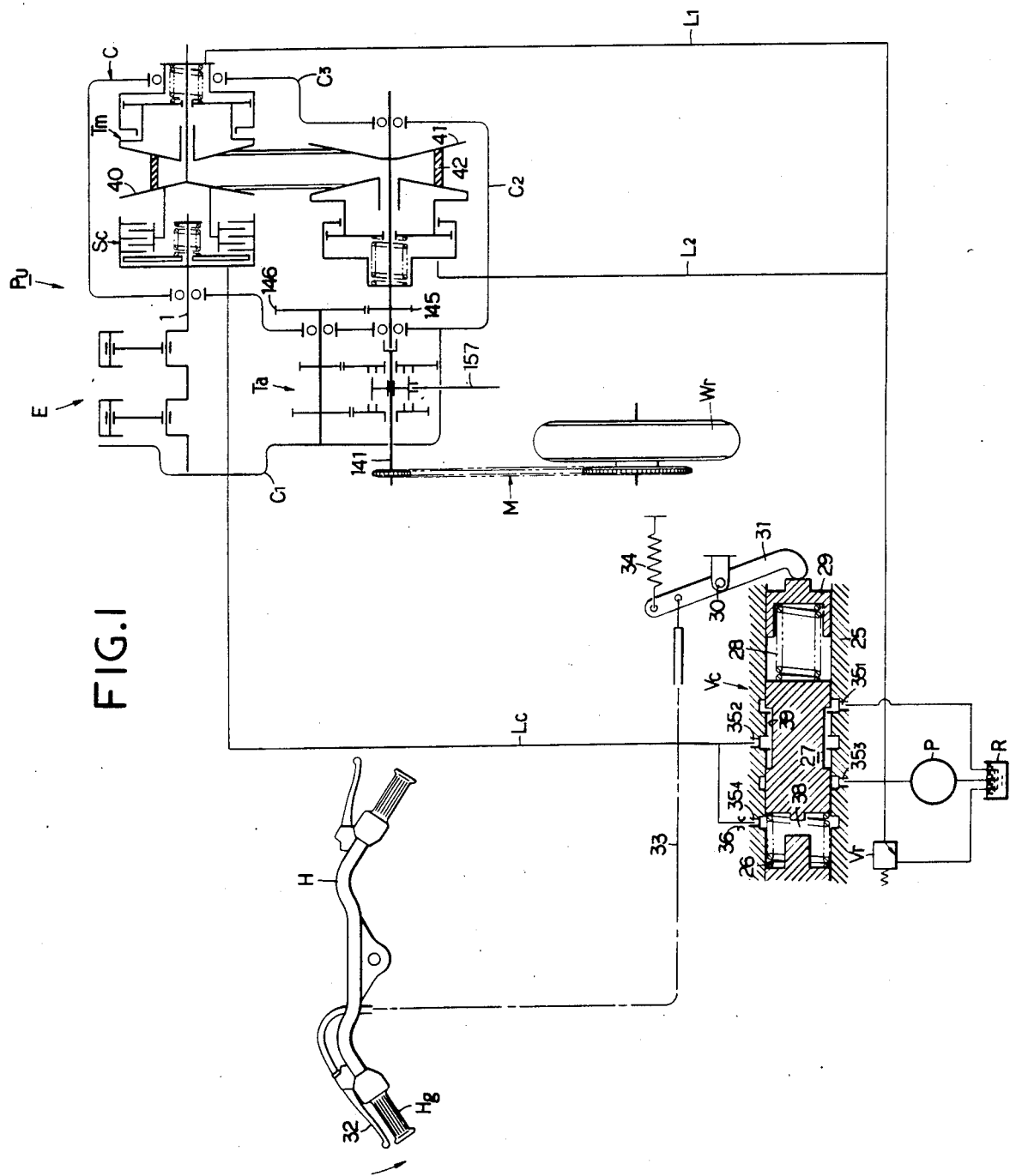
FIG. 1 is a schematic plan view of a power transmission system of a motor cycle.
Figure 2:
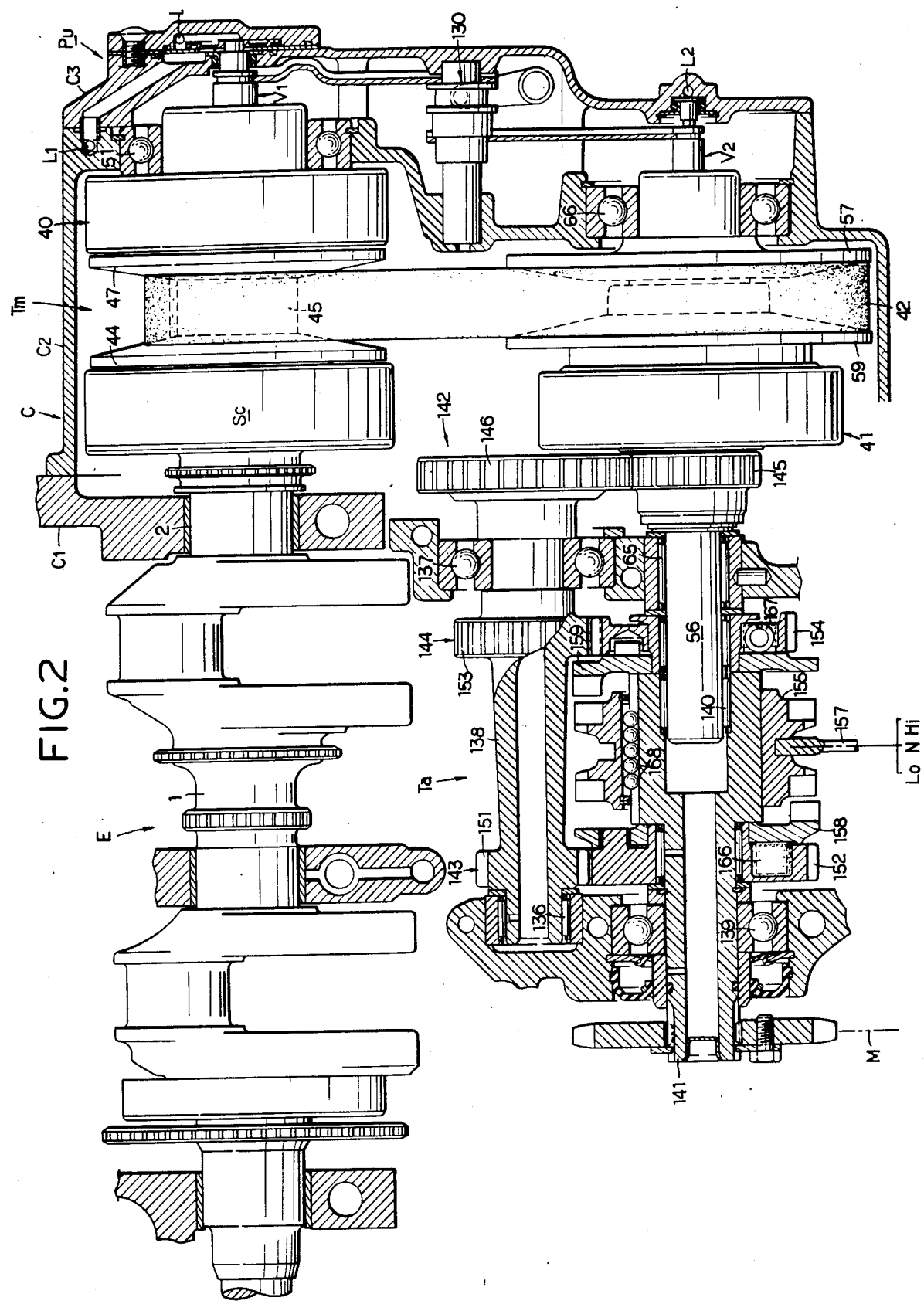
FIG. 2 is a longitudinal sectional plan view of a main part of a power unit in the power transmission system of FIG. 1.

In FIG. 1, Vr denotes a relief valve of the hydraulic pump P, and R denotes an oil reservoir formed on the bottom of the casing C.

A construction of each part of the power unit Pu will be described in order according to FIG. 2 and FIG. 3.

First, the starting clutch Sc is provided on the crankshaft 1 adjacently to the outside of a bearing 2 which is on the extreme right side and bears the crankshaft 1. The starting clutch Sc has a clutch outer member 4 spline-coupled as at 3 to the crankshaft 1 and a clutch inner member 5 formed solidly with a fixed pulley half-body 44 of a driving V-pulley 40 which will be described hereinafter. A plurality of driving friction plates 6 spline-fitted slidably to the clutch outer member 4 and a plurality of driven friction plates 7 spline-fitted slidably to the clutch inner member 5 are mounted in superposition alternately with each other between the clutch outer 4 and the clutch inner 5, a pressure ring 8 to prevent the driving friction plate 6 positioned on the outermost side from traveling outward is engaged with the clutch outer member 4. A hydraulic cylinder 9 is formed on the clutch outer member 4 at the side counter to the pressure ring 8, and a piston 11 facing the driving friction plate 6 positioned on the innermost side across a buffer spring 10 is made to slide with the cylinder 9. The piston 11 is pressed elastically by a return spring 12 disposed inside the clutch inner member 5 backwardly, or in the direction parting from a group of the friction plates 6, 7. A hydraulic fluid is supplied from the control oil passage Lc to a pressure oil chamber 13 of the hydraulic cylinder 9 by way of an oil passage 14 formed on the crankshaft 1.

Then, when a high-pressure hydraulic fluid is supplied to the pressure oil chamber 13, the piston 11 is exposed to the oil pressure and caused to advance while compressing the return spring 12, and the driving and driven friction plates 6, 7 are pressed against the pressure ring 8, thereby coupling both the friction plates 6, 7 through a half-clutch state. Under the above clutch-connected state, power transmitted to the clutch outer 4 from the crankshaft 1 is transferred to the clutch inner member 5 by way of both the friction plates 6, 7 and then transferred to the stepless transmission Tm on the next stage. If the hydraulic fluid in the hydraulic cylinder 9 is then discharged out, the piston 11 is retreated by an elastic force of the return spring 12, therefore the frictional coupling between both the friction plates 6, 7 is released (declutched), and thus the power is stopped from going any further.

The starting clutch Sc employs a wet system to cool down both the friction plates 6, 7 with the hydraulic fluid. Meanwhile, where cooling oil is oversupplied to both the friction plates 6, 7, a dragging phenomenon is caused between both the friction plates 6, 7 due to viscosity of the cooling oil at declutching, and both the friction plates 6, 7 become susceptible to sliding at clutching. Where, on the supply of contrary, the cooling oil is excessively short, the friction plates 6, 7 tend to overheat at the time of semi-clutching where much friction heat is generated. Therefore, it is required to control a supply of the cooling oil to be nil or a little at the time of clutching and declutching but to be much at the time of semi-clutching, and a flow control valve 15 is provided for such control.

The flow control valve 15 is cylindrically formed to slide in the oil passage 14 of the crankshaft 1, with such an arrangement that an oil pressure of the oil passage 14 works on the left end of the valve 15 and atmospheric pressure and elastic force of a return spring 16 work on the right end thereof. The flow control valve 15 has a valve port 17 communicated with the oil passage 14. An oil port 19 having an orifice 18 which is communicated with the valve port 17 when the valve 15 moves to a given right position for operation is provided on the crankshaft 1, and an oil port 20 to keep the oil port 19 communicated at all times inside the clutch inner member 5 through a spline connection 3 is provided on the clutch outer member 4.

Therefore, at the time of declutching when the oil passage 14 is under low pressure, the control valve 15 is retained to its left bound for operation by force of the return spring 16 so that the valve port 17 and the oil port 19 are disconnected as illustrated or properly restricted in their communication, and thus a supply of the cooling oil from the oil passage 14 to the starting clutch Sc is controlled to be nil or a little. When oil pressure in the oil passage 14 rises high enough to bring a semi-clutch state, the control valve 15 moves rightward by the oil pressure while compressing the return spring 16 to allow the valve port 17 to communicate with the oil port 19, thereby supplying the cooling oil sufficiently to the starting clutch Sc from the oil passage 14 through the valve port 17 and oil ports 19, 20. In this case a maximum flow of the cooling oil is regulated by the orifice 18. Further, when oil pressure in the oil passage 14 rises high enough to bring a clutched state and the control valve 15 operates further rightward, the valve port 17 and the oil port 19 are again disconnected or properly restricted in their communication, thereby controlling a supply of the cooling oil to be nil or a little again.

A description will next be made of the clutch valve Vc for operating the starting clutch Sc in FIG. 1. A return spring 26, a spool valve 27, a pressure regulating spring 28 and a push plate 29 are inserted in the mentioned order in a cylindrical valve box 25 with its one end closed. An actuating lever 31 supported at its center portion on a fixed bearing shaft 30 is coupled at its one end to an outermost push plate 29, and an operating cable 33 leading to a clutch lever 32 provided additionally on a steering handle H and an actuating spring 34 are connected to the other end of the actuating lever 31. The actuating spring 34 has a spring force more powerful than that of the pressure regulating spring 28, which spring 34 presses the pressure regulating spring 28 through the actuating lever 31 and the push plate 29 in accordance with release movement of the clutch lever 32 and thus can increase the set load.

The valve box 25 has first to fourth ports $35_1 \sim 35_4$ open to the inner wall thereof and positioned in a row from the pressure regulating spring 28 side. The first port $35_1$ is communicated with the oil reservoir R, the control oil passage Lc is extended from the second port $35_2$, the third port $35_3$ is communicated with the hydraulic pump P, and the fourth port $35_4$ is communicated with the control oil passage Lc through an orifice 36 and also with a reaction force oil pressure chamber 38 enclosing the return spring 26 in the valve box 25. On the other hand, the spool valve 27 has an annular groove 39 which is capable of alternately communicating the second port $35_2$ with the first port $35_1$ or the third port $35_3$.

Then, as shown in FIG. 1, if the actuating lever 31 is retreated thoroughly from the push plate 29 against the force of the actuating spring 34 by drawing the clutch lever 32 to the steering handle H side, the spool valve 27 is moved rightward by the return spring 26 to close the third port $35_3$ and communicate the first port $35_1$ with the second port $35_2$. Oil pressure in the hydraulic cylinder 9 of the starting clutch Sc is thus released to the oil reservoir R, therefore the starting clutch Sc becomes disconnected.

When an operating force of the clutch lever 32 is released step by step and the push plate 29 comes to press the pressure regulating spring 28 by the force of the actuating spring 34, the spool valve 27 moves leftward to close the first port $35_1$ to communicate the second port $35_2$ with the third port $35_3$, so that oil from the hydraulic pump P is supplied to the control oil passage Lc. And when the oil pressure of the control oil passage Lc rises accordingly, the oil pressure is introduced into the reaction force oil pressure chamber 38 by way of the orifice 36, therefore the spool valve 27 is again forced rightward until a push force of the oil pressure and a set load on the pressure regulating spring 28 become balanced. Oil pressure of the control oil passage Lc, i.e. a connecting oil pressure of the starting clutch Sc can therefore be raised in accordance with the increase in the set load of the pressure regulating spring 28 resulting from the returning operation of the clutch lever 32.

Even if the operating force of the clutch lever 32 is set light, a connecting oil pressure of the starting clutch Sc can be set satisfactorily large regardless of the arrangement of the clutch lever 32 in most cases by employing such clutch valve Vc, thus the starting clutch Sc can be miniaturized, and as mentioned hereinabove, such a miniaturization of the starting clutch Sc can further be promoted by providing it on the crankshaft 1 of the power unit Pu which has the highest rotational frequency and lowest torque.

The stepless transmission Tm will be described next.

The stepless transmission Tm is constituted mainly of a driving V-pulley 40 provided on the crankshaft 1 adjacently to the right side of the starting clutch Sc, a driven V-pulley 41 disposed adjacently to and rearwardly of the driving V-pulley 40, and a V-belt 42 stretched between both V-pulleys 40, 41.

The driving V-pulley 40 is constituted of a fixed pulley half-body 44 borne rotatably on the right end of the crankshaft 1 through a bearing 43, and a movable pulley half-body 47 coupled slidably to a cylindrical driving pulley shaft 45, which is integrally formed with the fixed pulley half-body 44, through two ball keys 46. The movable pulley half-body 47 is provided with a piston 49 fixed on the back of the former with a screw 48, and a hydraulic cylinder 50 accommodating the piston 49 has a rear wall plate 50a borne on the casing C through a ball bearing 51 coupled to the driving pulley shaft 45 with a retaining ring 52. The piston 49 divides the interior of the hydraulic cylinder 50 into a first oil pressure chamber $50_1$ on the V-belt 42 side and a second oil pressure chamber $50_2$ on the side counter thereto, and the pressure receiving surfaces of the piston 49 are formed so that the first oil pressure chamber $50_1$ side is made narrower than the second pressure oil chamber $50_2$ side.

Consequently, when oils of the same pressure are introduced into both the oil pressure chambers $50_1$, $50_2$, the piston 49 moves leftward by pressure difference caused by the difference in area of the left and right pressure receiving surfaces to make the movable pulley half-body 47 come near to the fixed pulley half-body 44, and thus an effective radius of the driving V-pulley 40, or a contact radius with the V-belt 42 can be enlarged. On the other hand, if oil pressure is released from the second oil pressure chamber $50_2$ while it is kept applied to the first oil pressure chamber $50_1$, the piston 49 moves rightward by the oil pressure of the first oil pressure chamber $50_1$ to keep the movable pulley half-body 47 away from the fixed pulley half-body 44, thus minimizing an effective radius of the driving V-pulley 40. A first control valve $V_1$ is provided in the driving pulley shaft 45 for such hydraulic operation of the piston 49, which will be described in detail later.

The hydraulic cylinder 50 is coupled, as mentioned above, to the driving pulley shaft 45 at its rear wall plate 50a through the retaining ring 52, as a result of which it is also kept in a solidly coupled state with the fixed pulley half-body 44. Thus a thrust load working between the fixed pulley half-body 44 and the hydraulic cylinder 50 in accordance with the hydraulic operation of the piston 49 can be transferred to and borne by the driving pulley shaft 45, thereby lightening the load on the ball bearing 51 which rotatably bears the hydraulic cylinder 50.

Figure 3:
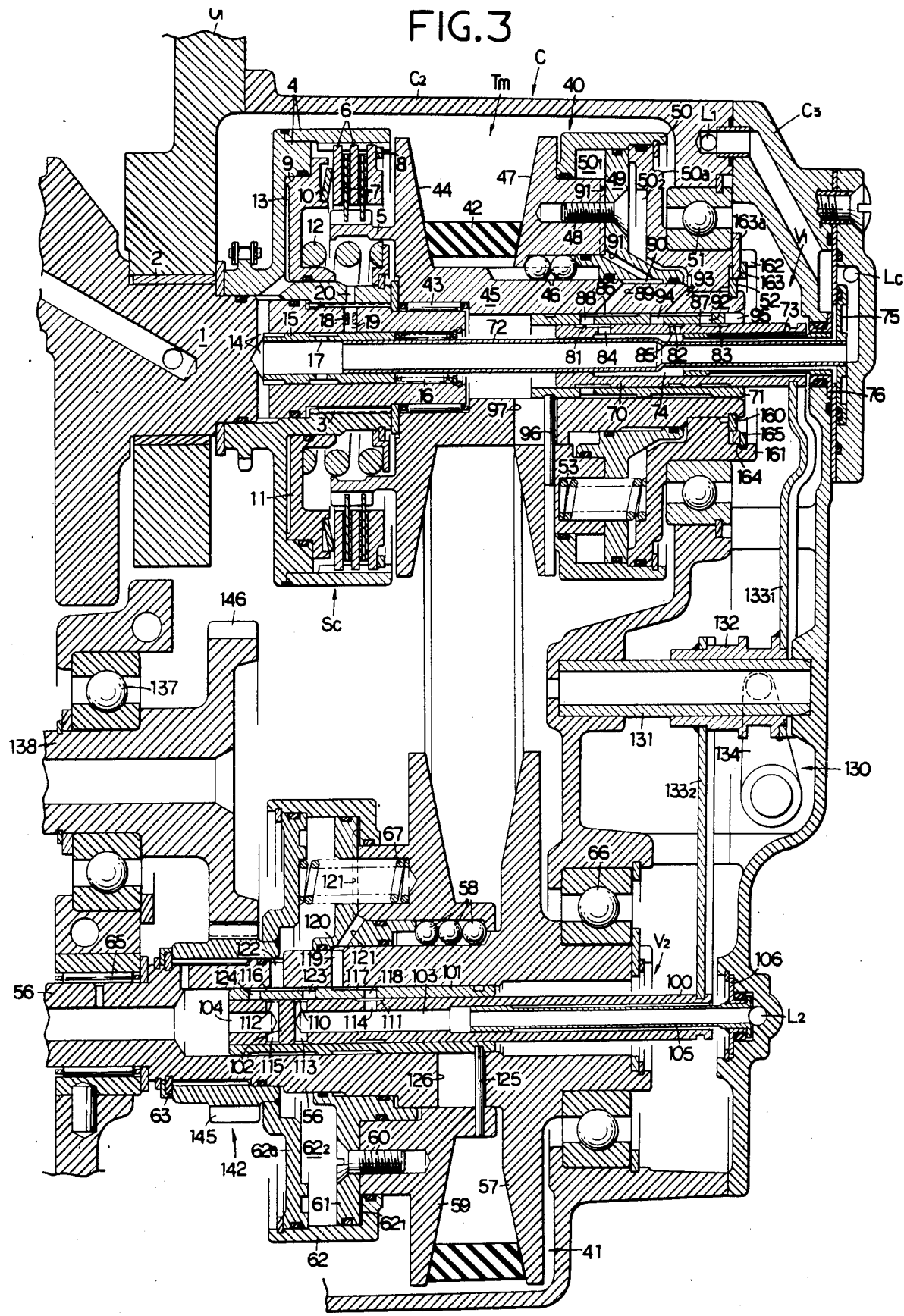
FIG. 3 is an enlarged longitudinal sectional plan view of a stepless speed change gear in the power unit.
Figure 4:
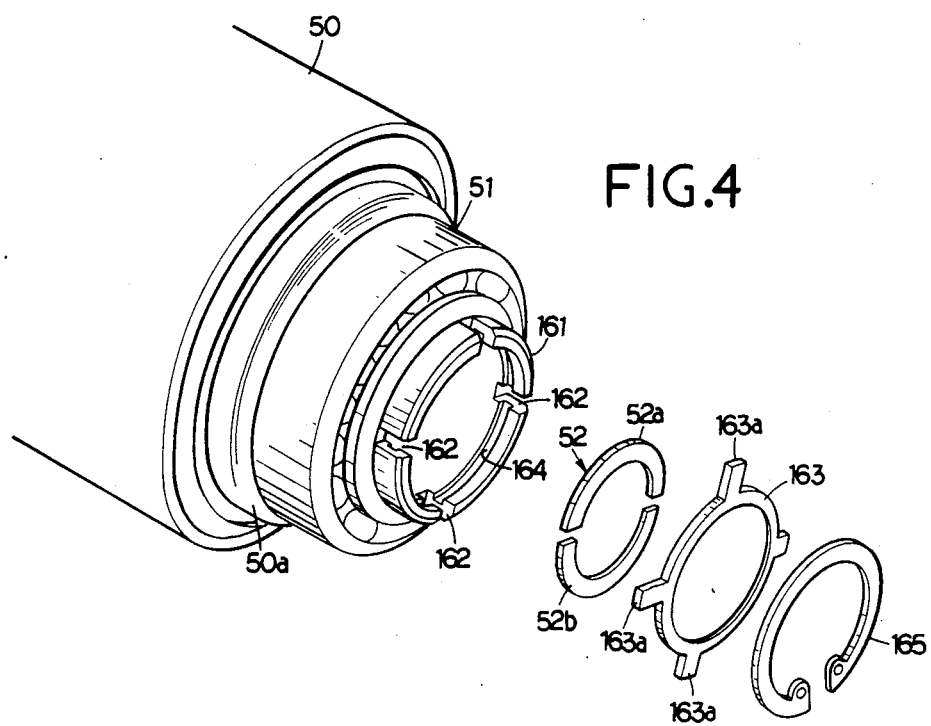
FIG. 4 is an exploded perspective view of a part thereof.

A locking device for the retaining ring 52 is described here with reference to FIG. 3 and FIG. 4. First, the retaining ring 52 is divided into two semi-annular members 52a, 52b so as to engage easily with an annular stop groove 160 formed on the circumference of the driving pulley shaft 45. On the other hand, a stop cylinder 161 surrounding the retaining ring 52 with a radially constant interval therebetween is formed on the outer end of the rear wall plate 50a of the hydraulic cylinder 50, and the cylinder 161 has a plurality of notches arranged at circumferentially equal intervals. An annular retainer 163 is fitted in an inner periphery of the stop cylinder 161 and an outer periphery of the two-split retaining ring 52. A plurality of retaining claws 163a projecting from the circumference of the retainer 163 are engaged with the notches 162, and are kept in contact with the outside of an inner race of the ball bearing 51. To prevent the annular retainer 163 from coming off the stop cylinder 161, a circlip 165 is installed in an annular stop groove 164 on the inner periphery of the stop cylinder 161, which is kept in contact with the annular retainer 163. Thus the annular retainer 163 retains the outer periphery of the retaining ring 52 or both the semi-annular members 52a, 52b to prevent them from coming off the stop groove 160 and also to hold the ball bearing 51 on the hydraulic cylinder 50, and the circlip 165 becomes powerful to strengthen its stop force onto the stop groove 164 upon receipt of centrifugal force so that the ball bearing 51 can be kept from coming off during rotating movement of the driving V-pulley 40.

The driven V-pulley 41 is constituted of a fixed pulley half-body 57 formed integrally with a driven pulley shaft 56, and a movable pulley half-body 59 coupled axially slidably to the driven pulley shaft 56 through three ball keys 58. The fixed pulley half-body 57 is disposed adjacently to and rearwardly of the movable pulley half-body 47 of the driving V-pulley 40, and the movable pulley half-body 59 is disposed adjacently to and rearwardly of the fixed pulley half-body 44. The movable pulley half-body 59 is provided with a piston 61 fixed to the back with a screw 60, and a hydraulic cylinder 62 accommodating the piston 61 has a rear wall plate 62a coupled to the driven pulley shaft 56 through a retaining ring 63. The piston 61 divides the interior of the hydraulic cylinder 62 into a first oil pressure chamber $62_1$ on the V-belt 42 side and a second oil pressure chamber $62_2$ on the side counter thereto, and the pressure receiving surfaces of the piston 61 are formed so that the first oil pressure chamber $62_1$ side is made narrower than the second oil pressure chamber $62_2$ side. Consequently, when oils of the same pressure are introduced into both the oil pressure chambers $62_1$, $62_2$, the piston 61 moves rightward by pressure difference caused by the difference in area of the left and right pressure receiving surfaces to make the movable pulley half-body 59 come near to the fixed pulley half-body 57, and thus an effective radius of the driven V-pulley 41 can be enlarged. On the other hand, if oil pressure is released from the second oil pressure chamber $62_2$ while it is kept applied to the first pressure oil chamber $62_1$, the piston 61 moves leftward by the oil pressure of the first oil pressure chamber $62_1$ to keep the movable pulley half-body 59 away from the fixed pulley half-body 57, thus minimizing an effective radius of the driven V-pulley 41. A second control valve $V_2$ is provided in the driven pulley shaft 56 for such hydraulic operation of the piston 61, which will be described in detail later.

The driven pulley shaft 56 has both left and right ends borne on the casing C through bearings 65, 66. Therefore, the hydraulic cylinder 62 is kept coupled uniformly with the fixed pulley half-body 57 through the retaining ring 63 and the driven pulley shaft 56 at a location between both the bearings 65, 66. Thus a thrust load working between the fixed pulley half-body 57 and the hydraulic cylinder 62 in accordance with the hydraulic operation of the piston 61 can be transferred to and borne on the driven pulley shaft 56, thereby lightening the load on the bearings 65, 66.

A description will now be made of the first and second control valves $V_1$, $V_2$ and the ambient oil passages.

The first control valve $V_1$ consists of a cylindrical driven spool valve 71 sliding in the hollow driving pulley shaft 45, and a main spool valve 70 sliding in the driven spool valve 71. An inside communication pipe 72 and an outside communication pipe 73 fitted in tandem are inserted in the main spool valve 70. Both the communication pipes 72, 73 are mounted on the cover $C_3$ through mounting members 75, 76 respectively, and the inside communication pipe 72 penetrates the main spool valve 70 horizontally to keep the control oil passage Lc provided on the cover $C_3$ of the casing C and the oil passage 14 leading to the oil pressure chamber 13 of the starting clutch Sc in communication with each other. Then, the inside communication pipe 72 forms a cylindrical oil passage 74 inside the main spool valve 70, which oil passage 74 communicates with the first lubricating channel $L_1$ provided in the auxiliary case $C_2$ and the cover $C_3$ through the outside communication pipe 73.

The main spool valve 70 has a pair of annular oil feeding channels 81, 82 and an annular oil purging channel 83 on the circumference, and the oil feeding channels 81, 82 communicate with the cylindrical oil passage 74 in the main spool valve 70 by way of through holes 84, 85. The driven spool valve 71 then has a pair of annular oil channels 86, 87 on the circumference, and the left side oil channel 86 is in communication at all times with the left side oil feeding channel 81 of the main spool valve 70 by way of a through hole 88 and also in communication at all times with the first oil pressure chamber $50_1$ by way of a through hole 89, an annular oil passage 90 and an oil passage 91. The right side oil channel 87 is in communication at all times with the oil purging channel 83 of the main spool valve 70 by way of a through hole 92 and also in communication at all times with the second oil pressure chamber $50_2$ of the hydraulic cylinder 50 by way of a through hole 93. Further, the driven spool valve 71 is provided with a through hole 94 for controlling connection and disconnection between the right side oil channel 87 and the right side oil feeding channel 82 of the main spool valve 70, and a notched oil purging port 95 for controlling connection and disconnection between the oil purging channel 83 of the main spool valve 70 and the interior of the casing C. In addition, the driven spool valve 71 is coupled to the movable pulley half-body 47 through an interlocking pin 96 which radially penetrates the driving pulley shaft 45, thus enabling the spool valve 71 to move horizontally together with the movable pulley half-body 47. The portion where the driving pulley shaft 45 is penetrated by the interlocking pin 96 is formed in a slot 97 so as not to prevent a horizontal move of the interlocking pin 96.

The second control valve $V_2$ consists of a cylindrical driven spool valve 101 sliding in the hollow driven pulley shaft 56, and a main spool valve 100 sliding in the driven spool valve 101. A lubricating channel 103 and an oil purging channel 104 isolated from each other by a bulkhead 102 are formed at the center of the main spool valve 100. The lubricating channel 103 communicates with the second lubricating channel $L_2$ formed in the cover $C_3$ by way of a communication pipe 105 inserted therein, and the oil purging channel 104 opens to a hollow zone of the driven pulley shaft 56 communicating with the interior of the casing C. The communication pipe 105 is mounted on the cover $C_3$ through a mounting member 106.

The main spool valve 100 has a pair of annular oil feeding channels 110, 111 and an annular oil purging channel 112 on the circumference, of which the oil feeding channels 110, 111 communicate with the lubricating channel 103 by way of through holes 113, 114 and the oil purging channel 112 communicates with the oil purging channel 104 by way of a through hole 115. The driven spool valve 101 has a pair of annular oil channels 116, 117 on the circumference, of which the right side oil channel 117 is in communication at all times with the right side oil feeding channel 111 of the main spool valve 100 by way of a through hole 118 and also in communication with the first oil pressure chamber $62_1$ of the hydraulic cylinder 62 by way of a through hole 119, an annular oil passage 120 and an oil passage 121, and the left side oil channel 116 is in communication at all times with the second pressure oil chamber $62_2$ of the hydraulic cylinder 62 by way of a through hole 122. The driven spool valve 101 is provided with through holes 123, 124 for controlling connection and disconnection between its left side oil channel 116 and the left side oil feeding channel 110 and the oil purging channel 112 of the main spool valve 100, respectively. Further, the driven spool valve 101 is coupled to the movable pulley half-body 59 through an interlocking pin 125 radially penetrating the driven pulley shaft 56, thus enabling the spool valve 101 to move horizontally together with the movable pulley half-body 59. The portion where the driven pulley shaft 56 is penetrated by the interlocking pin 125 is formed in a slot 126 so as not to prevent a horizontal movement of the interlocking pin 125.

To actuate the driving side movable pulley half-body 47 and the driven side movable pulley half-body 59 synchronously, both the first and second control valves $V_1$, $V_2$ are coupled through an interlocking mechanism 130. The interlocking mechanism 130 consists of a supporting shaft 131 provided on the casing C intermediately between the control valves $V_1$, $V_2$ in parallel therewith, a shifter 132 supported slidably on the supporting shaft 131, and a pair of interlocking rods $133_1$, $133_2$ having the base ends fixed on the shifter 132 and the tips coupled to the main spool valves 70, 100 of both the control valves $V_1$, $V_2$, the shifter 132 being actuated according to the operation of a shift lever 134 provided on the casing C, while the shift lever 134 being actuated by an automatic speed change actuator Ac which will be described later.

Operations of both the control valves $V_1$, $V_2$ will be described hereinafter. As illustrated in FIG. 3, when the shifter 132 is positioned at the right bound for operation to come in contact with the cover $C_3$, the through hole 94 of the driven spool valve 71 is closed by the main spool valve 70 to disconnect the right side oil feeding channel 82 and the right side oil channel 87 in the first control valve $V_1$, the oil purging channel 83 comes to communicate with the oil purging port 95, while the left side oil feeding channel 81 is always kept in communication with the left side oil channel 86 so that a hydraulic fluid pressure on standby at the cylindrical oil passage 74 is introduced into the first oil pressure chamber $50_1$ by way of the oil channels 81, 86, and the second oil pressure chamber $50_2$ is opened to the oil purging port 95 through the oil channels 82, 87. Consequently, the piston 11 is moved rightward by the oil pressure in the first oil pressure chamber $50_1$ and holds the movable pulley half-body 47 at the rear bound.

In this case, in the second control valve $V_2$, the left side oil feeding channel 110 of the main spool valve 100 communicates with the left side oil channel 116 by way of the through hole 123, and the through hole 124 of the driven spool valve 101 is closed by the main spool valve 100, thus disconnecting the oil purging channel 112 and the left side oil channel 116. On the other hand, since the right side oil feeding channel 111 is always communicated with the right side oil channel 117, a hydraulic fluid pressure on standby at the lubricating channel 103 is introduced into both the first and second pressure oil chambers $62_1$, $62_2$ of the hydraulic cylinder 62, the piston 61 then is moved rightward by the differential oil pressure as mentioned hereinabove to hold the movable pulley half-body 59 at the forward bound.

Thus an effective radius of the driving V-pulley 40 is controlled at a minimum and the effective radius of the driven V-pulley 41 at a maximum, therefore the driving V-pulley 40 is capable of driving the driven V-pulley 41 at a maximized transmission ratio.

Next, when the shifter 132 is moved leftward, both the main spool valves 70, 100 are moved concurrently leftward by the interlocking rods $133_1$, $133_2$. Then, when the through hole 94 is opened by the leftward movement of the main spool valve 70 to allow the right side oil feeding channel 82 to communicate with the right side oil channel 87 and also the oil purging port 95 is closed by the main spool valve 70, a hydraulic fluid pressure within the cylindrical oil passage 74 is introduced into the second oil pressure chamber $50_2$. Therefore, the piston 49 starts moving leftward, as described hereinabove, by differential oil pressure and moves the movable pulley half-body 47 forward. Then the advance of the movable pulley half-body 47 is transferred to the driven spool valve 71 through the interlocking pin 96, therefore the spool valve 71 also moves concurrently to follow the main spool valve 70, and the through hole 94 and the oil purging port 95 are closed by the main spool valve 70. When the second oil pressure chamber $50_2$ has been disconnected from its communication with both the cylindrical oil passage 74 and oil purging port 95, the piston 49 and the movable pulley half-body 47 consequently stop moving. Namely, the movable pulley half-body 47 is capable of moving forward accordingly as the main spool valve 70 moves leftward.

Then, the through hole 123 is closed by the main spool valve 100 in accordance with its leftward movement, and the through hole 124 is opened to allow the oil purging channel 112 to communicate with the left side oil channel 116, therefore oil pressure within the second oil pressure chamber $62_2$ is released to the oil purging channel 104. The piston 61 therefore is started moving leftward by the oil pressure of the first pressure oil chamber $62_1$ to move the movable pulley half-body 59 rearward. Then the backward movement of the movable pulley half-body 59 is transmitted to the driven spool valve 101 through the interlocking pin 125, so that the spool valve 101 also moves concurrently to follow the main spool valve 100, thus both the through holes 113, 114 are closed by the driven spool valve 101, and when the second oil pressure chamber $62_2$ has been disconnected from both the lubricating channel 103 and the oil purging channel 104, the piston 61 and the movable pulley half-body 59 consequently stop moving. Namely, the movable pulley half-body 59 is capable of moving rearward accordingly as the main spool valve 100 moves leftward.

As described, the movable pulley half-body 47 of the driving V-pulley 40 moves forward synchronously with the rearward movement of the movable pulley half-body 59 of the driven V-pulley 41, and therefore an effective radius of the driving V-pulley 40 can be decreased simultaneously with enlargement of an effective radius of the driven V-pulley 41 without giving an excessive tension to the V-belt 42, thus decreasing the transmission ratio precisely between both the V-pulleys 40, 41.

Springs 53, 67 for pressing the movable pulley half-bodies 47, 59 elastically forward are provided in the hydraulic cylinders 50, 62. When oil pressure has not yet been introduced into the hydraulic cylinders 50, 62, the springs 53, 67 function to remove the slack of the V-belt 42 by providing a pre-tension thereto.

Figure 5:
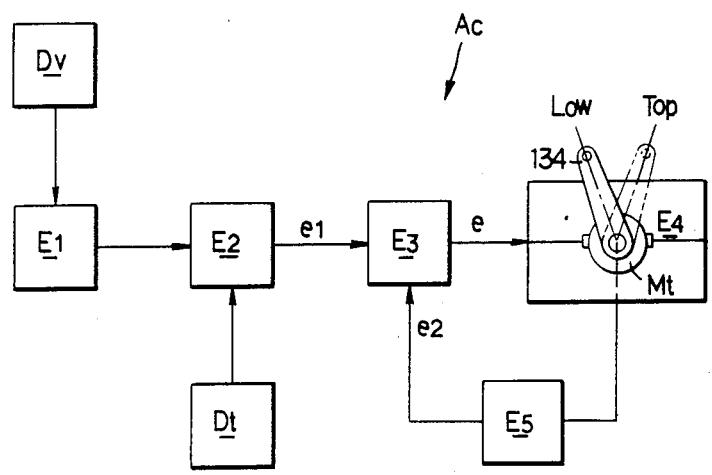
FIG. 5 is a circuit diagram of an automatic speed change actuator of the stepless speed change gear.

Meanwhile, the automatic speed change actuator Ac for the stepless V-belt transmission Tm comprises a speed detector Dv which detects the rotational frequency of wheels as a vehicle speed, as shown in FIG. 5, and generates an electric pulse in frequency proportional to the vehicle speed, a frequency-voltage conversion circuit $E_1$ which receives the pulse generated by the speed detector Dv to generate a voltage according to the frequency, an amplification degree variable type amplifier circuit $E_2$ which amplifies an output voltage of the circuit $E_1$ and is further capable of varying the amplification degree, a throttle valve opening detector Dt which detects a throttle valve opening of the engine E of FIG. 1 and generates a signal to change the amplification degree of the amplifier circuit $E_2$ in accordance with the opening, a differential circuit $E_3$ which receives an output voltage $e_1$ of the amplifier circuit $E_2$ and an output voltage $e_2$ of a feedback circuit $E_5$ described later and outputs a positive or negative voltage e according to positive or negative state of the value $e_1-e_2$, a driving circuit $E_4$ having a motor Mt which is adapted to run forward or reversely according to positive or negative state of the output voltage e of the differential circuit $E_3$, and the feedback circuit $E_5$ which detects an angle position of the output shaft of the motor Mt to output a voltage $e_2$ according to the detected position to the amplifier circuit $E_3$. The motor Mt of the driving circuit $E_4$ has its output shaft coupled to the shift lever 134 of the stepless transmission Tm. The shift lever 134 can be turned at the time of forward running toward a TOP position whereat the transmission ratio of the stepless transmission Tm is minimized and at the time of reversing toward a LOW position whereat the transmission ratio is maximized.

Figure 6:
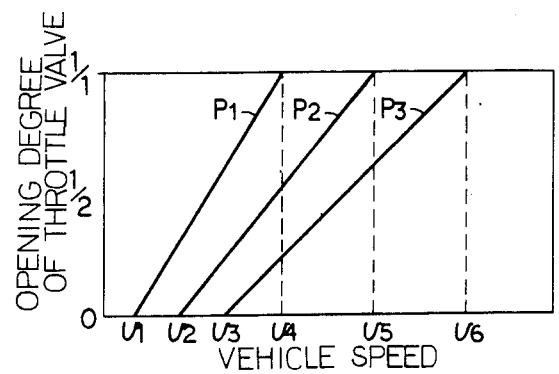
FIG. 6 is an output characteristic diagram of an amplifier circuit in the automatic speed change actuator.

Then, when the throttle valve opening of the engine E is minimized, the amplification degree of the amplifier circuit is set at maximum according to the output signal of the throttle valve opening detector Dt, and thus the amplifier circuit $E_2$ produces a relatively high output voltage $e_1$ against a low input from the frequency-voltage conversion circuit $E_1$. On the other hand, as shown in FIG. 6, when the speed is stepped up to $v_1$, $v_2$, $v_3$, the output voltage of the amplifier circuit $E_2$ rises to $P_1$, $P_2$, $P_3$ accordingly.

Then, when the throttle valve opening is maximized, the amplification degree of the amplifier circuit is set at minimum according to the output signal of the throttle valve opening detector Dt, therefore, to obtain an output voltage equivalent to those of $P_1$, $P_2$, $P_3$ on the amplifier circuit $E_2$, the speed must be increased to $v_4$, $v_5$, $v_6$ the values of which are greater than those $v_1$, $v_2$, $v_3$. The lines $P_1$, $P_2$, $P_3$ are equioutput voltage lines consequently, which can be given in proper curves as well as straight lines as illustrated by selecting an amplification characteristic of the amplifier circuit $E_2$.

When the voltage $e_1$ corresponding to the throttle valve opening and the vehicle speed is thus outputted from the amplifier circuit $E_2$, it is inputted to the differential circuit $E_3$. On the other hand, the output voltage $e_2$ inputted to the differential circuit $E_3$ from the feedback circuit $E_5$ rises accordingly as the motor Mt continues its forward running.

Now, where $e_1 > e_2$, the output e of the differential circuit $E_3$ has a positive value and the driving circuit $E_4$ is actuated to run the motor Mt forward so that the shift lever 134 is turned toward the TOP position, and thus the transmission ratio of the stepless transmission Tm is decreased. The output voltage $e_2$ of the feedback circuit $E_5$ then rises in accordance with the above turning movement of the shift lever 134 whereby the state wherein the transmission ratio has been decreased as above is fed back to the differential circuit $E_3$, and when $e_1=e_2$, the differential circuit $E_3$ stops outputting.

Then, where $e_1 > e_2$, the output e of the differential circuit $E_3$ has a negative value, and hence the motor Mt is reversed to turn the shift lever 134 toward the LOW position until $e_1=e_2$. Thus, a given transmission ratio corresponding to the vehicle speed and throttle valve opening can be provided automatically to the stepless transmission Tm.

Next, the stepped transmission Ta will be described with reference to FIG. 1 and FIG. 2.

The stepped transmission Ta has an input shaft 138 with both the ends borne on the main case $C_1$ through bearings 136, 137, and an output shaft 141 with both the ends borne on the main case $C_1$ and the driven pulley shaft 56 through bearings 139, 140. Therefore, the output shaft 141 is disposed on the axis same as the driven pulley shaft 56, and the input shaft 138 is disposed between the output shaft 141 and the crankshaft 1. The input shaft 138 is coupled to the driven pulley shaft 56 through a junction gear train 142 in the auxiliary case $C_2$ and also coupled to the output shaft 141 through low-speed and high-speed gear trains 143, 144 in the main case $C_1$.

As shown in FIG. 3, the junction gear train 142 is formed solidly with the rear wall plate 62a of the hydraulic cylinder 62 and also constituted of a pinion 145 spline-connected with the driven pulley shaft 56 and a gear wheel 146 secured to an end of the input shaft 138 and engaged directly with the pinion 145. Consequently, rotations of the driven pulley shaft 56 are reduced one step by the junction gear train 142 and so transferred to the input shaft 138.

As shown in FIG. 2, the low-speed gear train 143 is constituted of a driving gear 151 formed solidly with the input shaft 138 and a driven gear 152 borne rotatably on the output shaft 141 and driven by the gear 151 while the high-speed gear train 144 is constituted of a driving gear 153 formed solidly with the input shaft 138 and a driven gear 154 borne rotatably on the driven pulley shaft 56 and driven by the gear 153. The transmission ratio is set higher naturally on the low-speed gear train 143 than on the high-speed gear train 144.

Clutch members 158, 159 are coupled to the driven gears 152, 154 through dampers 166, 167 respectively, and a shifter 155 capable of dogging the clutch members 158, 159 alternately is coupled axially slidably to the output shaft 141 through a plurality of ball keys 168. Therefore, the shifter 155 has two transfer positions, a low-speed position Lo to couple with the clutch member 158 of the driven gear 152 and a high-speed position Hi to couple with the clutch member 159 of the driven gear 154. The shifter 155 can further take a neutral position N for coupling with neither of the clutch members 158, 159, and the transfer of the shifter 155 is carried out by means of a shift fork 157 interlocking with a manual speed change grip Hg provided on the steering handle H of FIG. 1, i.e. a manual speed change actuator.

Thus, the low-speed gear train 143 or the high-speed gear train 144 becomes ready for operation by transferring the shifter 155 to the position Lo or Hi, therefore a transmission ratio in two high/low steps can be provided between the input and output shafts 138, 141. Particularly, the shifter 155 is capable of sliding smoothly and axially on the output shaft 141 by the ball keys 168, so that the shifter 155 can be transferred for operation from the position Lo to Hi and vice versa without disconnecting the starting clutch Sc during transmission by the stepless transmission Tm, and shocks caused by the transfer operation on the transmission system can be absorbed by not only the dampers 166, 167 of the driven gears 152, 154 but also by the V-belt 42 of the stepless transmission Tm, thus ensuring a comfortable driving feeling at all times. In addition, if the stepped transmission Ta is normally used at the position Hi of the shifter 155, a kick-down state is obtainable instantaneously by simply transferring the shifter 155 to the position Lo through a manual operation of the speed change grip Hg even under any condition of the stepless transmission Tm.

FIG. 7 represents another embodiment of the auxiliary transmission, wherein the arrangement of the low-speed gear train, the high-speed gear train and the shift mechanism for selectively coupling the low-speed or high-speed gear train to the output shaft is different from the embodiment shown in FIG. 2. However, other construction than the above is the same, and hence like members are identified by the same symbols.

In FIG. 7, a low-speed gear train 143' is constituted of a driving gear 151' spline-connected to the input shaft 138 and a driven gear 152' borne rotatably on the output shaft 141 and driven by the gear 151' while a high-speed gear train 144' is constituted of a driving gear 153' spline-connected to the input shaft 138 together with the driving gear 151', and a driven gear 154' borne on the output shaft 141 rotatably and driven by the gear 153'. The transmission ratio is set naturally higher on the low-speed gear train 143' than on the high-speed gear train 144'. Further, a shifter 155' which is capable of alternately dogging the driven gear 152' or 154' is slidably spline-fitted at 156' to the output shaft 141. Therefore the shifter 155' has two transfer positions, a low-speed position Lo to couple with the driven gear 152' and a high-speed position Hi to couple with the driven gear 154', which shifter 155' can additionally take a neutral position N for coupling with neither of the driven gears 152', 154', and the transfer of the shifter 155' is carried out by means of a shift fork 157'. Thus, the low-speed gear train 143' or the high-speed gear train 144' becomes ready for operation by transferring the shifter 155' to the position Lo or Hi, therefore the transmission ratio in two high/low steps can be provided between the input and output shafts 138, 141.

Incidentally it is to be noted that, on the contrary to the illustrated embodiments, the right end of the output shaft 141 can be supported on the casing C, and the left end of the driven pulley shaft 56 can be supported on that right end of the output shaft 141.

As described above, according to the present invention, a stepless V-belt transmission and a stepped gear transmission are mounted in series in a power transmission system connecting an engine crankshaft and a driving wheel so that the range of transmission ratio of the stepless V-belt transmission is set in a domain comparatively high in transmission efficiency and a shortage thus involved of the range of transmission ratio is compensated with the range of transmission ratio of the stepped gear transmission, whereby the overall range of transmission ratio can be set satisfactorily wide without deteriorating the life of the V-belt and also a high transmission efficiency can be secured at all times. Furthermore, since a kick-down state is obtainable instantaneously by the transfer operation of the stepped transmission, a quick acceleration can be obtained for driving without operating the stepless transmission in which a time lag is unavoidable for change in speed. Furthermore, the arrangement that the range of transmission ratio of the stepless V-belt transmission can be narrowed by providing the stepped gear transmission additionally, enables both the driving and driven V-pulleys to be formed in small size as compared with a conventional stepless V-belt transmission having the same overall range of transmission ratio also enables the wheel base between both V-pulleys and the amount of movement of each movable pulley half-body to be reduced. Accordingly, a casing to enclose these components can be made compact even in consideration of mounting space for the stepped gear transmission, and a load imposed on the V-belt of the stepless V-belt transmission can be lightened to improve its longevity to a remarkable extent.

In addition, since a driven V-pulley of the stepless V-belt transmission and an output shaft of the stepped gear transmission are arranged on the same axis so that the one can support the other, the bearing structure of the casing can be simplified to contribute to make the entire structure compact.

Further, the driven V-pulley is coupled to an input shaft of the stepped gear transmission through a junction gear train so as to rotate the driven V-pulley and the output shaft in the same direction, and therefore a relative running speed between the driven V-pulley and the output shaft is controlled to lie low at all times to lighten a burden of the bearing formed therebetween, thereby prolonging remarkably the longevity of the bearing.

Furthermore, the arrangement is such that the speed change operation of the stepless V-belt transmission is carried out automatically in association with the engine throttle valve opening and vehicle speed, and the speed change operation of the stepped gear transmission is carried out manually. As a result, a driver can be free from a troublesome speed change operation of the stepless transmission, and need only to manipulate the stepped transmission, thus securing the kick-down operation easily and precisely.

What is claimed is:

1. A vehicular speed change gear for a vehicle having an engine provided with a crankshaft, a driving wheel, and a power transmission system which operatively connects said crankshaft and driving wheel together, comprising a stepless V-belt transmission and a stepped gear transmission disposed in series in said power transmission system, said stepped gear transmission including a low-forward speed gear train and a high-forward speed gear train for selectively providing forward low and high speed transmission ratios respectively, and a clutch disposed between said crankshaft and said stepless V-belt transmission for operative connection therebetween, said stepless V-belt transmission including an adjustable driving pulley, an adjustable driven pulley, a V-belt therebetween and control valve means in each said driving and said driven pulleys for adjusting said pulleys and thereby adjust the drive ratio between said pulleys.

2. A vehicular speed change gear as defined in claim 1, wherein said stepless V-belt transmission comprises: a driving V-pulley coupled through said clutch to said crankshaft and having a fixed pulley half-body and a movable pulley half-body which is capable of moving back and forth against the fixed pulley half-body; a driven V-pulley coupled to said stepped gear transmission and having a fixed pulley half-body and a movable pulley half-body which is capable of moving back and forth against the fixed pulley half-body; and a V-belt stretched between said driving and driven V-pulleys.

3. A vehicular speed change gear for a vehicle having an engine provided with a crankshaft, a driving wheel, and a power transmission system which operatively connects said crankshaft and driving wheel together, comprising a stepless V-belt transmission and a stepped gear transmission disposed in series in said power transmission system, said stepped gear transmission including a low forward speed gear train and a high-forward speed gear train for selectively providing forward low and high speed transmission ratios respectively, and a clutch disposed between said crankshaft and said stepless V-belt transmission for operative connection therebetween, said stepless V-belt transmission including a driving V-pulley coupled through said clutch to said crankshaft and having a fixed pulley half-body and a movable pulley half-body which is capable of moving back and forth against the fixed pulley half-body; a driven V-pulley coupled to said stepped gear transmission and having a fixed pulley half-body and a movable pulley half-body which is capable of moving back and forth against the fixed pulley half-body; and a V-belt stretched between said driving and driven V-pulleys, a first control valve positioned in said driving V-pulley for controlling movement of said movable pulley half-body of said driving V-pulley and a second control valve positioned in said driven pulley for controlling movement of said movable pulley half-body of said driven V-pulley, said first and second control valves being both operatively coupled through an interlocking mechanism for operatively connecting said movable pulley half-body of said driving V-pulley and said interlocking mechanism being adapted to decrease and increase an effective radius of said driven V-pulley equivalently and simultaneously in accordance with the respective amount of increase and decrease in an effective radius of said driving V-pulley.

4. A vehicular speed change gear as defined in claim 2, wherein said stepped gear transmission comprises an input shaft, an output shaft disposed in parallel with the input shaft and coupled thereto through a plural stage of transmission gear trains, and an intermediate gear train for coupling said input shaft and said driven V-pulley together and rotating said output shaft in the same direction as the driven V-pulley, said driven V-pulley and said output shaft being disposed on the same axis so that the one supports the other.

5. A vehicular speed change gear as defined in claim 3 further comprising an automatic speed change actuator connected to said stepless transmission for automatically operating the latter for speed change in association with the engine throttle valve opening and vehicle speed, and a manual actuator connected to said stepped transmission and manually operating the stepped transmission for speed change.

6. A vehicular speed change gear as defined in claim 5, wherein said automatic speed change actuator is constituted of: a vehicle speed detector which detects the rotation of the wheel as vehicle speed and generates an electric pulse of frequency proportional to the vehicle speed; a frequency-voltage conversion circuit which receives the pulse generated by the vehicle speed detector and generates a voltage corresponding to the frequency of the pulse; an amplification degree variable amplifier circuit which amplifies an output voltage of the frequency-voltage conversion circuit and is further capable of varying the amplification degree; a throttle valve opening detector which detects an engine throttle valve opening and generates a signal for varying an amplification degree of the amplifier circuit in accordance with the degree of the throttle valve opening; a differential circuit which receives an output voltage $e_1$ of said amplifier circuit and an output voltage $e_2$ of a feedback circuit described later and outputs a positive or negative voltage corresponding to the positive or negative state of a value $e_1-e_2$; a driving circuit which runs a motor provided therein forward or reversely according to the positive or negative state of an output voltage of said differential circuit; and the feedback circuit which detects an angular position of the output shaft of said motor to output the voltage $e_2$ in accordance with such position to the differential circuit, the output shaft of said motor being operatively connected to the interlocking mechanism of said stepless transmission, thereby so operating as to change a transmission ratio of the stepless transmission in accordance with said motor's forward or reverse running.

7. A vehicular speed change gear as defined in claim 2. wherein said clutch includes a clutch outer member and a clutch inner member, said clutch inner member being integrally formed with the fixed pulley half-body of said driving V-pulley.

* * * * *